United States Patent Office 3,783,086
Patented Jan. 1, 1974

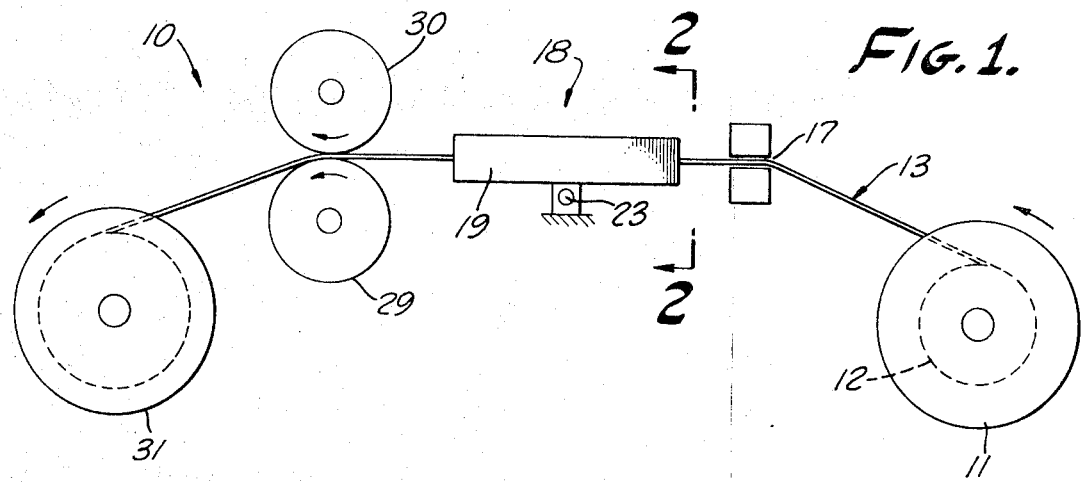
FIG. 1.
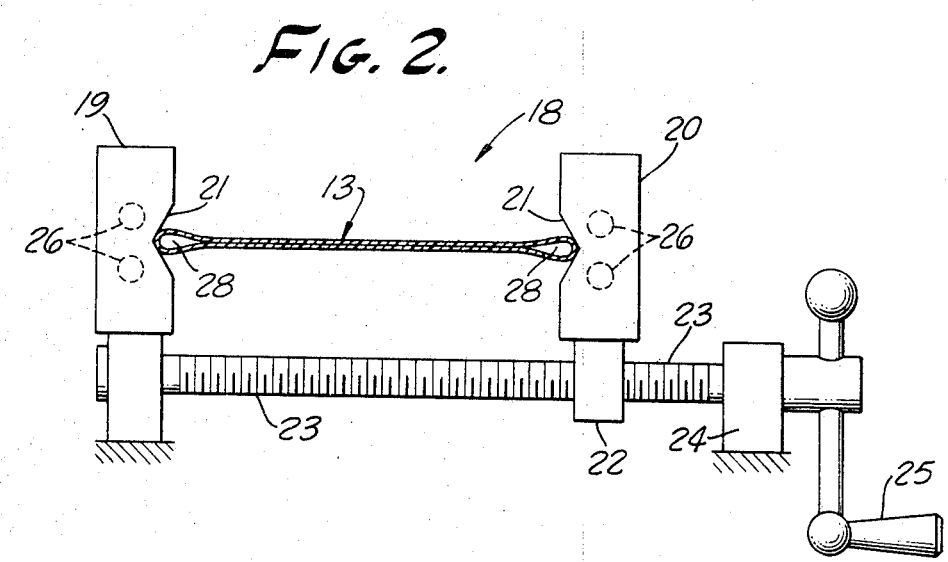
FIG. 2.
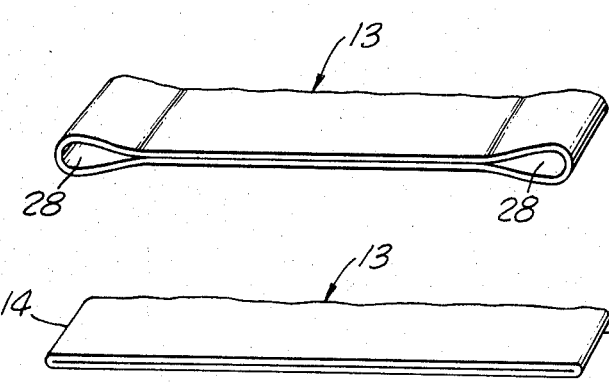
FIG. 4.
FIG. 3.
INVENTOR
WALTER A. PLUMMER
BY
ATTORNEYS.

3,783,086
FLATTENED HEAT REACTIVE TUBING WITH
EXPANDED PASSAGE
Walter A. Plummer, 3546 Crownridge Drive,
Sherman Oaks, Calif. 91403
Original application May 13, 1969, Ser. No. 824,102, now
abandoned. Divided and this application Sept. 1, 1971,
Ser. No. 176,950
Int. Cl. B32b 1/00, 3/02, 3/20
U.S. Cl. 161—126                6 Claims

ABSTRACT OF THE DISCLOSURE

A heat reactive length of plastic tubing having a bulged opening through the end thereof to facilitate entry of an object into the tube to expand the tubing and facilitate the assembly thereof over an object.

This application is a division of my copending application for United States Letters Patent Ser. No. 824,102, filed May 13, 1969, entitled, "Method for Processing Heat Reactive Thermoplastic Tubing and the Product Formed Thereby," now abandoned.

This invention relates to heat reactive thermoplastic tubing, and more particularly to an improved product of this material embodying an open passage at the end of the flattened tubing and serving to expedite the entry of an object for expanding the tubing to receive an object to be encased at least in part by said tubing.

A highly versatile packaging and protective envelope material has recently become available in the market place in the form of a fully flattened heat-reactive thermoplastic tubing. This tubing has a thin flexible wall structure impervious to moisture and extremely durable, tough, abrasion resistant and the walls of which are heat fusable to one another or to other thermoplastic material. This tubular material has a highly pronounced shrinkage coefficient when heated to a temperature only slightly above normal room temperature. Accordingly, it is adapted to be readily assembled about an object to be packaged or protected following which low heating of the tubing film suffices to activate its shrinkage capabilities. The tubing product is available in a wide range of diameters. By selecting a size most appropriate for a particular object, the object can be easily and quickly inserted into the tubing following which it readily shrinks into snug fitting engagement with the adjacent surfaces of the object. The material readily accommodates itself to differential shrinking thereby automatically adapting itself to irregularities in the surface of the object.

A serious drawback to the use of tubing referred to above resides in the fact that the heat reactive processing to which the basic material is subjected to impart its shrinkage characteristics provides a tubing product having its opposed side walls flattened flush against one another. The locked-in internal stresses associated with its heat-reactive properties are particularly pronounced at the return bends of the flattened tubing making it a laborious, time consuming operation to separate the walls at the tubing ends when endeavoring to telescope it over an item being enclosed therewithin. Various expedients have been resorted to in efforts to gain access to the interior of the tubing but, prior to the present invention, these have not been satisfactory or productive. These efforts have included attempts to jet pressurized air into the ends of the tubes to expand the walls away from one another, and so trimming the end of the tubing as to provide a leading end engageable with the fingernail or some sharp instrument. However, neither these no rother efforts have been successful.

By the present invention there is provided simple apparatus and a technique for processing flattened heat-reactive or heat-shrinkable tubing to bulge the edge portion just sufficiently to permit entry of an object and thereby expedite expansion of the remainder of the cross section. This expedient does not interfere with the compact packaging and storage of the product itself until ready for use, yet provides a continuous shallow passage lengthwise of the product into which the operator's thumbnail or some other object can be inserted and employed to open the remainder of the tubing end. For some purposes, only one edge need be so processed although it is found desirable and helpful if both edges are similarly processed.

The material is processed rapidly and uniformly by passing the portion to be expanded in heating proximity to a heat source effective to heat only a selected portion of the tubing. As the heated portion softens slightly, certain of the internal stresses are relieved and rendered immediately effective to bulge the softened portion. One simple mode of processing the tubing comprises feeding the flat stock continuously past a source of heat effective to heat only a limited edge area of the tube. The portion so heated immediately bulges and takes a set while cooling.

Accordingly, it is a primary object of this invention to provide an improved technique for processing flattened heat-reactive thermoplastic tubing to cause a selected portion thereof to bulge and take a set in bulged condition.

Another object of the invention is the provision of a thermoplastic tubing product having a high shrinkage coefficient and having a small passage extending generally lengthwise thereof.

Another object of the invention is the provision of a simple method of processing heat-reactive tubing to provide a shallow passage closely adjacent one lateral edge thereof.

These and other more specific objects will appear upon reading the following specification and claims and upon considering in connection therewith the attached drawing to which they relate.

Referring now to the drawing in which a preferred embodiment of the invention is illustrated:

FIG. 1 is a generally schematic side elevational view of apparatus suitable for practicing the invention method;

FIG. 2 is a cross sectional view on an enlarged scale taken along line 2—2 on FIG. 1;

FIG. 3 is a fragmentary perspective view of the tubing prior to processing; and

FIG. 4 is a view similar to FIG. 3 but showing the tubing processed to provide a bulge along either lateral edge.

Referring initially more particularly to FIGS. 1 and 2, there is shown apparatus, designated generally 10, suitable for practicing the invention method. Since the details of the main frame are of no consequence, none is shown but it will be understood that this frame includes suitable means for supporting a supply reel 11 holding a quantity 12 of heat-reactive thermoplastic tubing 13 having the initial configuration illustrated in FIG. 3.

It will be understood that tubing 13 is available as a flexible ribbon-like tube the opposite side walls of which are fully flattened against one another while being processed to give it its high heat shrinkage characteristics. Although the tube walls are thin and readily flexible, internal stresses prevail throughout the wall structure including the return bend portions 14. For this reason, it is difficult and vexatious to attempt spreading the walls apart sufficiently to insert an object. To overcome this shortcoming, tubing 13 is processed according to the present invention by passing it from supply reel 11 through a slot 17, and thence through a processing station designated generally 18. There the tubing is suitably supported, as by the adjustable jaws 19, 20 having opposed notches 21 spaced to allow tubing 13 to pass therebetween with negligible resistance. Although not shown, it will be understood that a simple conveyor belt may underly the mid portion of the tubing between notches 21 and used in lieu of the latter to support the tubing. As herein shown, jaw 19 is stationary whereas jaw 20 has a threaded boss 22 mating with the threads of an adjusting screw 23. This screw has one end journalled in jaw 19 and the other end journalled in a stationary boss 24 mounted on the machine frame. Hand crank 25 can be rotated to adjust jaw 20 relative to jaw 19 thereby to accommodate the processing of tubing 13 of various widths.

Any simple means may be provided for applying heat to the return bend portions 14 of the flattened tubing. Such means may comprise hot air supply passages or small electric heaters 26 extending lengthwise of jaws 19, 20 and effective to heat only one or both edges of the tubing as it passes through processing station 18. Only sufficient heat should be applied to the tubing to soften a narrow band thereof. Such softening enables the internal stresses imposed during the heat reaction processing to become effective to expand the tubing thereby providing one or more long shallow passages 28, 28 having a tear drop shape in cross section. It is unnecessary to supply pressurized air into these passages during heating, the mere heating and partial softening of these edges permitting the softened portions to expand automatically into the configuration shown.

As the tubing passes to the left past processing station 18 it enters between a pair of drive rollers 29, 30 and onto take up reel 31. The latter is preferably power driven in any suitable manner. It will be understood that suitable drag mechanism for supply reel 11 may be employed to maintain the tubing under slight tension while being processed.

The completed product may be stored on reels or cut to appropriate length for packaging in straight strip form. In use, the operator inserts his fingernail or a tool carried in or attached to the palm of his hand into one end of passage 28 and employs this entry to expand the tubing as necessary for the insertion of the article being packaged.

While the particular flattened heat reactive tubing with expanded passage herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:
1. A continuous flattened tube of heat shrinkable thermoplastic material having a high shrinkage coefficient and usable as a protective heat shrinkable enclosure characterized in the provision of a continuous bulbous open-ended passage formed in major part by a narrow strip of said tube extending lengthwise thereof which strip has been heated to shrink and bulge the same crosswise thereof thereby to facilitate entry of an object into one end of said passage to expand said flattened tube to receive an object to be protected thereby.

2. A continuous shrinkable tube as defined in claim 1 characterized in that said open-ended passage is located along one lateral edge of the otherwise fully flattened tubing thereby expediting insertion of the tubing about an object to be protected by enabling a workman to open the tubing from either lateral edge.

3. A tube as defined in claim 1 characterized in that said tubing is formed with an open-ended passage along either lateral edge thereof and useful to expedite gaining access into said flattened tube.

4. A tube as defined in claim 3 characterized in that the tube walls between said passages along either lateral edge lie flush against one another unless forcibly moved apart.

5. A tube as defined in claim 1 characterized in that except for said passage the tube walls lie flush against one another unless forcibly moved apart.

6. A continuous tube of thin flexible heat-shrinkable thermoplastic material initially manufactured with its sidewalls collapsed flush against one another from edge to edge thereof, said tube having a narrow band extending lengthwise thereof and intergral with the thermoplastic material to either side thereof which band is arched crosswise thereof from end to end of said tube to provide a continuous open passage, said narrow band having been heat shrunk into said arched shape by heat applied only to said band and effective to cause said band to shrink and bulge, and the heat shrinkage capabilities of the major portion of said tube remaining unimpaired and available for use upon the application of heat thereto.

References Cited
UNITED STATES PATENTS

| | | | |
|---|---|---|---|
| 3,260,776 | 7/1966 | Lindstrom et al. | 264—210 X |
| 3,502,524 | 3/1970 | Stanhope | 156—294 X |
| 2,920,967 | 1/1960 | Heinemann | 99—171 |
| 3,300,555 | 1/1967 | Bild et al. | 264—99 X |
| 3,635,504 | 1/1972 | Borden | 156—294 X |
| 3,142,608 | 7/1964 | Techtmann et al. | 156—515 |

WILLIAM A. POWELL, Primary Examiner

U.S. Cl. X.R.

156—84, 198; 161—127, 139, 149, 402